US010577863B2

(12) United States Patent
Garfield

(10) Patent No.: US 10,577,863 B2
(45) Date of Patent: Mar. 3, 2020

(54) SUSPENDED WORK STATION

(71) Applicant: John Garfield, Rochester Hills, MI (US)

(72) Inventor: John Garfield, Rochester Hills, MI (US)

( * ) Notice: Subject to any disclaimer, the term of this patent is extended or adjusted under 35 U.S.C. 154(b) by 0 days.

(21) Appl. No.: 16/135,681

(22) Filed: Sep. 19, 2018

(65) Prior Publication Data

US 2019/0085634 A1 Mar. 21, 2019

Related U.S. Application Data

(60) Provisional application No. 62/560,945, filed on Sep. 20, 2017.

(51) Int. Cl.

| | |
|---|---|
| ***F16M 11/00*** | (2006.01) |
| ***E06C 7/14*** | (2006.01) |
| ***A47B 5/02*** | (2006.01) |
| *E06C 7/16* | (2006.01) |

(52) U.S. Cl.

CPC .................. *E06C 7/14* (2013.01); *A47B 5/02* (2013.01); *E06C 7/165* (2013.01)

(58) Field of Classification Search

CPC ................ A63G 9/12; E04G 1/30; E06C 7/14

See application file for complete search history.

(56) References Cited

U.S. PATENT DOCUMENTS

| | | | | |
|---|---|---|---|---|
| 2,801,886 A * | 8/1957 | Peterson | E06C 7/16 182/121 |
| 3,052,442 A | 9/1962 | Rankin, Jr. | |
| 3,734,236 A | 5/1973 | Houtler | |
| 3,837,034 A | 9/1974 | Leffert et al. | |
| 3,901,165 A * | 8/1975 | Schlesinger | A47B 43/006 108/149 |
| 3,998,416 A | 12/1976 | Benolkin | |
| 4,261,435 A | 4/1981 | Winter | |
| 4,527,763 A | 7/1985 | Woytowich | |
| 4,624,430 A | 11/1986 | Ehmke | |
| 4,653,608 A | 3/1987 | Casada | |
| 4,702,446 A | 10/1987 | Brown | |
| 5,154,383 A | 10/1992 | Collinson | |
| 5,259,525 A | 11/1993 | Wion | |
| 5,275,256 A * | 1/1994 | Ellzey | E06C 7/14 104/246 |

(Continued)

OTHER PUBLICATIONS

AC24 Multi-Purpose Project Tray, https://www.wernerco.com/us/products/ladders/ladder-accessories/AC24Series/AC24, last accessed Aug. 13, 2019.

(Continued)

*Primary Examiner* — Amy J. Sterling

(74) *Attorney, Agent, or Firm* — The Dobrusin Law Firm, P.C.; Bryan S. Lemanski

(57) ABSTRACT

An article comprising: (i) a tray having one or more through holes extending from a work surface of the tray to an opposing surface of the tray through a thickness of the tray; and (ii) one or more lines routed through the one or more through holes to support the opposing surface of the tray, each of the one or more lines connected to a locking mechanism, wherein the one or more locking mechanisms are adapted to secure the article to an object in a suspended state, the suspended state having the tray hanging by the one or more lines.

20 Claims, 5 Drawing Sheets

(56) References Cited

U.S. PATENT DOCUMENTS

| | | | | |
|---|---|---|---|---|
| 5,370,263 | A | 12/1994 | Brown | |
| 5,429,205 | A | 7/1995 | Collins | |
| 5,542,553 | A | 8/1996 | Penniman | |
| 5,855,346 | A | 1/1999 | Hall | |
| 5,967,259 | A | 10/1999 | Williams | |
| 6,105,911 | A | 8/2000 | Olexson | |
| 6,148,957 | A | 11/2000 | Ahl et al. | |
| 6,264,151 | B1 | 7/2001 | Schiller | |
| 6,564,941 | B2 | 5/2003 | Hedges | |
| 7,178,633 | B2 | 2/2007 | Angotti | |
| D549,839 | S | 8/2007 | Zodnik | |
| D620,613 | S | 7/2010 | Jensen | |
| 8,033,362 | B1 | 10/2011 | Cull | |
| 8,123,000 | B2 | 2/2012 | Whitaker | |
| 8,365,863 | B2 * | 2/2013 | Astor | E06C 7/14 182/129 |
| 8,636,145 | B1 | 1/2014 | Toleski | |
| 9,789,409 | B1 * | 10/2017 | Yakos | A63G 9/12 |
| 2002/0121407 | A1 * | 9/2002 | Pass | E04G 1/30 182/121 |
| 2004/0108164 | A1 | 6/2004 | Pruett et al. | |
| 2004/0217242 | A1 | 11/2004 | Foreman | |
| 2005/0056486 | A1 | 3/2005 | Butler et al. | |
| 2005/0247838 | A1 | 11/2005 | Zodnik | |
| 2008/0017771 | A1 | 1/2008 | Anderson | |
| 2012/0103726 | A1 | 5/2012 | Morfidis et al. | |
| 2016/0115736 | A1 | 4/2016 | Beachy | |

OTHER PUBLICATIONS

General Purpose Ladder Tool Caddy, https://www.roofingsuperstore.co.uk/product/general-purpose-ladder-tool-caddy.html, last accessed Aug. 13, 2019.

Werner AC Utility Bucket for Use with Ladders, https://www.lowes.com/pd/Werner-AC-Utility-Bucket-for-Use-with-Ladders/3031875, last accessed Aug. 13, 2019.

* cited by examiner

SUSPENDED WORK STATION

FIELD

The present teachings generally relate to a suspended work station. More specifically, the work station provides a user with a work surface and storage space to contain one or more tools, materials, other items, or a combination thereof during completion of a desired task. The suspended work station may be utilized while on a ladder by attaching the work station to the ladder.

BACKGROUND

Professional contractors, their employees, and novice handymen alike complete a variety of tasks on residential and commercial buildings. These tasks may include painting, construction, electrical work, plumbing, flooring, or a combination thereof. Often times, a variety of materials and tools are required to successfully complete the task. For example, a painter may require a plurality of paint cans, brushes, rollers, tape, a paint shield, and additional items to finish painting a desired room or exterior of a building. Frequently, the task requires work on portions of a building not readily accessible from the ground. For example, the painting of a building's exterior requires a ladder to reach higher portions of the building out of reach from the ground. When performing such a task, it is often not practical or possible to bring all the necessary tools and materials onto the ladder. Furthermore, attempting to carry every item needed to complete the job may be dangerous at such heights and result in slipping or falling from the ladder.

To help accommodate work in difficult or heightened locations, a variety of caddies and work platforms were created. Examples of such caddies and work platforms include those described in U.S. Pat. Nos. 3,837,034; 4,653,608; 6,105,911; and 8,365,863; and U.S. Publication Nos. 2002/0121407 and 2004/0108164, all of which are incorporated by reference herein for all purposes. However, the caddies and work platforms may be difficult to install/uninstall, may be positioned in a difficult to reach location, may not support a sufficient weight, or a combination thereof. Additionally, the caddies and work platforms may be expensive and heavy due to excessive materials and attachment mechanisms being utilized.

It may be attractive to have a work station that allows a user to effectively store and organize the materials and tools necessary to complete a job; that is easy to install and uninstall; that maintains a secured work surface to complete a job on a ladder or other location other than the ground floor; that is cost effective and lightweight; that can sufficiently support the weight of the necessary tools and materials; or any combination thereof. Therefore, what is needed is a suspended work station that provides cutouts, notches, receiving shapes, or a combination thereof to effectively store and organize materials and tools necessary to complete a job. What is needed is a suspended work station that can removably attach to a ladder or other object using one or more lines, one or more locking mechanisms, or both. What is needed is a suspended work station that can be connected at a desired location on a ladder, the work station adapted to support the weight of the tools and material without fracturing or disconnection from the ladder.

SUMMARY

The present teachings meet one or more of the present needs by providing: a work station comprising: (i) a tray having one or more through holes extending from a work surface of the tray to an opposing surface of the tray through a thickness of the tray; and (ii) one or more lines routed through the one or more through holes to support the opposing surface of the tray, each of the one or more lines connected to a locking mechanism, wherein the one or more locking mechanisms are adapted to secure the article to an object in a suspended state, the suspended state having the tray hanging by the one or more lines; wherein the one or more lines are routed through a first hole by entering the through hole from the work surface of the tray and routed through a second hole by entering the through hole from the opposing surface, so that the one or more lines abut the opposing surface to support the tray in the suspended state; wherein the tray includes one or more notches along a peripheral edge of the tray; and wherein the tray includes one or more cut outs extending through the thickness of the tray.

The present teachings meet one or more of the present needs by providing: a method of installing a work station comprising: wrapping a first and second line around an outer perimeter of the object so that the line follows a contour of the outer perimeter; and engaging the locking mechanisms secured to each of the first and second lines, wherein the locking mechanisms clip to a portion of the first and second lines and prevent unintentional disengagement.

DETAILED DESCRIPTION

Figure 1:
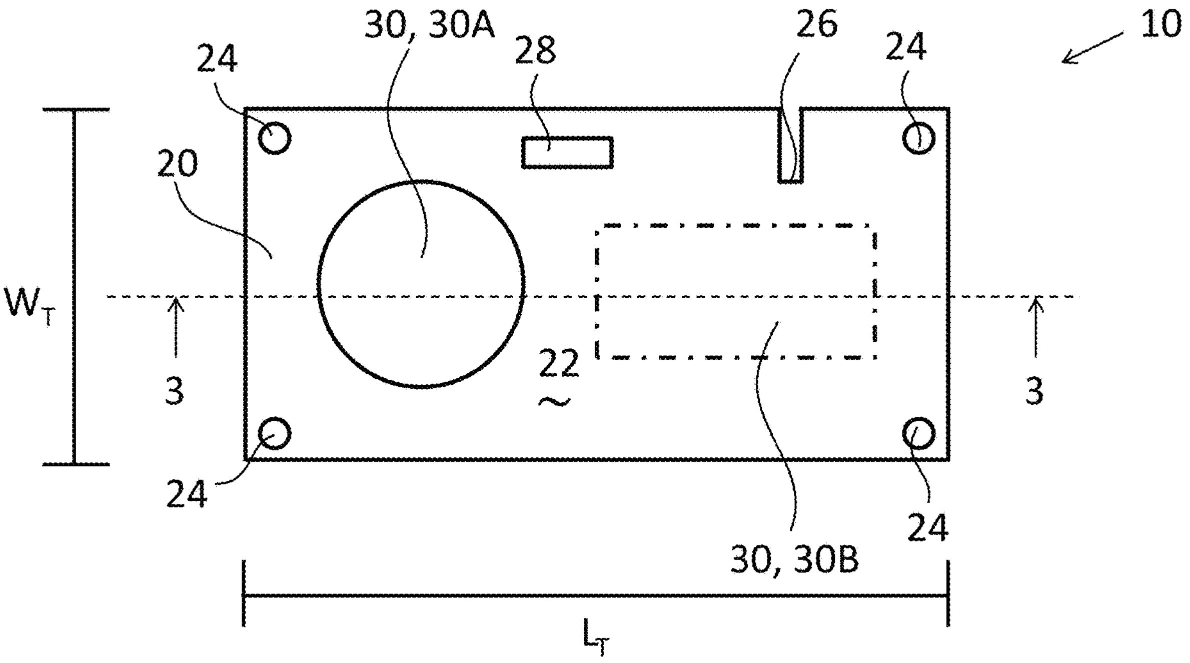
FIG. 1 is a top view of a work station.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a work station for organizing and storing one or more desired tools, materials, or both while completing a job. The work station may connect to one or more objects so that the work station maintains its position in a suspended state. For example, the work station may connect to one or more rungs of a ladder so that the work station is suspended from the ladder while the ladder is in use. The work station may include a tray. The work station may include one or more lines, one or more locking mechanisms, or both to connect the work station to a desired object. The work station may directly or indirectly be secured to a desired object. For example, the work station may include one or more locking mechanisms to secure the work station directly to a ladder, or the work station may connect to an adapter secured to the ladder and adapted to receive a portion of the work station. The work station may be a uniform piece or may comprise a plurality of components. The work station may include one or more layers. For example, the tray of the work station may include a core formed of a structurally rigid material and an exterior shell of padded, compressible material. The work station may be formed, at least in part, from one or more metals, such as iron, steel (e.g., alloy steels, such as tool steel or High-Strength Low-Alloy (HSLA) steel, 1008/1010 steel, heat treated mid to high-carbon steel, stainless steel, or a combination thereof), tungsten, molybdenum, cobalt, vanadium, copper, chromium, brass, nickel, aluminum, or a combination thereof. The work station may be formed at least in part, from non-metal materials, such as a polymeric material, polyamide, polycarbonate, polypropylene, polystyrene, thermoplastics, thermosets, elastomers, rubber, wood, or a combination thereof. The work station may include a tray.

The tray of the work station may function to support one or more tools, materials, other items, or a combination thereof. The tray may function to provide a user a work area. For example, the tray may provide a worker an area to assemble or disassemble one or more components prior to installation. The tray may be adapted to organize one or more tools, materials, other items, or a combination thereof. The tray may include one or more projections, one or more depressions, or both to organize the one or more tools, materials, other items, or a combination thereof. The tray may be customizable to aid a user based on the present task. For example, the tray may include movable containers so that a user may remove or include one or more of the movable containers on the tray based on a desired size and shape of the containers.

The tray may be a single layer or may include multiple layers. For example, the tray may include a structurally rigid foam core and one or more metal exterior surfaces adhered to the foam core. The tray may be formed, at least in part, from one or more metals such as iron, steel (e.g., alloy steels, such as tool steel or High-Strength Low-Alloy (HSLA) steel, 1008/1010 steel, heat treated mid to high-carbon steel, stainless steel, or a combination thereof), tungsten, molybdenum, cobalt, vanadium, copper, chromium, brass, nickel, aluminum, or a combination thereof. The tray may be formed, at least in part, from one or more non-metal materials such as a polymeric material, polyamide, polycarbonate, polypropylene, polystyrene, thermoplastics, thermosets, elastomers, rubber, wood, or a combination thereof. The tray may include one or more protective coatings to prevent environmental degradation of the tray. For example, the tray may include a polyurethane or other moisture resistant coating to prevent mold and corrosion. The one or more protective coatings may be applied to one or more layers of the tray or may be integrally formed with the one or more layers. For example, the tray may be wood, and the wood may be pressure-treated to prevent environmental degradation or may be stained, painted, or both.

The tray may be flexible to prevent fracturing. The tray may be structurally rigid. The tray may be sufficiently rigid to support the weight of the one or more tools, materials, other items, or a combination thereof. For example, the tray may be adapted to support about 2 kilograms (kg) of weight or greater, about 4 kg of weight or greater, about 6 kg of weight or greater, or about 8 kg of weight or greater. The tray may be adapted to support about 16 kg of weight or less, about 14 kg of weight or less, about 12 kg of weight or less, or about 10 kg of weight or less. The tray may vary in thickness. For example, the tray may have a thickness of about 10 mm or greater, about 20 mm or greater, or about 30 mm or greater. The tray may have a thickness of about 60 mm or less, about 50 mm or less, or about 40 mm or less. The tray may have a uniform thickness or may have a varying thickness. For example, a first half of the tray may have a thickness of about 30 mm and a second half of the tray may have a thickness of about 60 mm so that one or more surfaces of the tray may undulate. The tray may include one or more strengthening ribs, beads, gussets, or a combination thereof to improve structural integrity. The one or more strengthening ribs, beads, gussets, or a combination thereof may be located on, or integrally formed with, one or more surfaces of the tray. The tray may vary in shape. For example, the tray may be rectangular, ovular, round, square, trapezoidal, octagonal, triangular, or a combination thereof. Dimensions of the tray may be selected based on a desired application. For example, a length of the tray may be greater than a width of a ladder so that the tray extends past one or more rails of the ladder for easy accessibility for a user. Alternatively, a width of the tray may be greater than a length of the tray to accommodate items with a deeper (i.e., wider) dimension. The tray may include a work surface to accommodate the one or more tools, materials, items, or a combination thereof.

The work surface may function to secure and/or support the one or more tools, materials, other items, or a combination thereof while the work station is secured to an object. The work surface may provide a work area for a user. The work surface may be a surface of the tray. For example, when the work station is installed and suspended from a ladder, a top surface of the tray defined as the uppermost surface of the tray substantially parallel to the ground may act as the work surface. The work surface may be an additional surface extending or protruding from a surface of the tray. The work surface may be substantially smooth or may include one or more friction modifiers. For example, the work surface may include an abrasive or adhesive surface modifier to prevent unwanted sliding or movement of one or more items located on the work surface. The work surface may include one or more labels, shapes, or lines painted or etched into the work surface indicating a desired location to place one or more items to maintain organization. The work surface, the tray, or both may include one or more cutouts.

The cutouts may function to hold or secure one or more tools, materials, other items, or a combination thereof. The cutouts may be defined as one or more hollowed shapes extending from a top surface (i.e. work surface) of the tray to an opposing bottom surface through the thickness of the tray so that the one or more tools, materials, other items, or a combination thereof may extend through the thickness of the tray. The cutouts may be substantially shaped to accommodate a desired tool, material, other item, or a combination thereof. For example, the cutouts may be substantially shaped to secure a paint brush such that a bottom surface of the head of the paint brush rests along the work surface when inserted into the cutout, preventing paint on the paint brush from contacting the work surface. The cutouts may be triangular, oval, circular, rectangular, square, trapezoidal, or a combination thereof. The cutouts may be integrally formed with the tray. For example, the tray may be injection-molded and the cutouts may be designed directly into the mold. The cutouts may be created after forming of the tray. For example, the cutouts may be cut, drilled, punched, grinded, sawed, or a combination thereof.

The cutouts may include one or more rounded edges to prevent unwanted damage of one or more tools, materials, other items, or a combination thereof inserted into the cutouts. For example, the tray may be metal and have one or more cutouts, each cutout including one or more burrs formed during the manufacturing process. The burrs may be grinded or sanded down so that the edges of the cutouts are substantially filleted to form substantially smooth surfaces. The cutouts may include a sleeve inserted into the cutouts. The cutouts may extend from a top surface (i.e., the work surface) to an opposing bottom surface, or may extend from one side surface to an opposing side surface. For example, the cutout may extend from a first side surface to an opposing side surface through a length or width of the tray. The cutouts may be substantially perpendicular to the work surface. The cutouts may extend at an angle other than substantially perpendicular to the work surface. For example, the angle of the cutouts relative to the work surface may be about 45 degrees or greater, about 60 degrees or greater, or about 75 degrees or greater. The angle may be about 135 degrees or less, about 120 degrees or less, or about 105 degrees or less. The cutouts may be used in combination with one or more receiving shapes to organize and secure the one or more tools, materials, other items, or a combination thereof.

The receiving shapes may function to secure the one or more tools, materials, other items, or a combination thereof on the work surface of the tray. The receiving shapes may organize the one or more tools, materials, other items, or a combination thereof. The receiving shapes may extend from the work surface through a portion of the thickness of the tray to form a recess of a desired depth relative to the work surface. For example, a receiving shape may be substantially shaped to receive a paint can. Alternatively, the receiving shape may be substantially square to receive a paint roller tray. The receiving shapes may have a depth relative to the work surface of about 2 mm or greater, about 4 mm or greater, or about 6 mm or greater. The receiving shapes may have a depth relative to the work surface of about 12 mm or less, about 10 mm or less, or about 8 mm or less. The receiving shapes may be located within an interior area of the tray surface (e.g., on the work surface away from the perimeter of the work surface). The receiving shapes may extend to one or more peripheral edges of the tray. For example, the receiving shape may be a "T-shaped" slot extending from a longitudinal axis of the tray to a peripheral edge such that one or more items may slide into the slot from the peripheral edge. The receiving shapes may be any surface of the tray. The receiving shapes may protrude from the tray to form a compartment to receive the one or more tools, materials, other items, or a combination thereof. One or more notches may be adapted to maintain the position of one or more tools, materials, other items, or a combination thereof on the work surface that may not practically fit within the cutouts, receiving shapes, or both.

The notches may function to secure one or more tools, materials, other items, or a combination thereof along a peripheral edge of the tray. The notches may be cut out from one or more peripheral edges of the tray and extend through the thickness of the tray. The notches may extend inwardly towards a longitudinal axis through a width or length of the tray. The notches may be adapted to receive one or more desired tools, materials, other items, or a combination thereof. For example, the notch may be substantially rectangular so that a paint brush roller may be inserted into the notch, allowing the handle of the roller to rest along the work surface while the roller itself is free of contact with the tray. The notches may be triangular, rectangular, ovular, circular, trapezoidal, square, or a combination thereof. The notches may be integrally formed with the tray. For example, the tray may be injection-molded and the notches are designed directly into the mold. The notches may be created after forming of the tray. For example, the notches may be cut, drilled, punched, grinded, sawed, or a combination thereof. The notches may be positioned along a peripheral edge near one or more through holes.

The through holes may function to receive one or more lines connected to the tray, an object, or both. The through holes may extend through the thickness of the tray from the work surface to the opposing bottom surface (e.g., the through holes are bored through the tray). The through holes may be substantially round, rectangular, triangular, square, trapezoidal, ovular, or a combination thereof. The through holes may be evenly dispersed near one or more peripheral edges of the tray. For example, the tray may be substantially rectangular and include a through hole near each of the four corners of the perimeter of the tray. The through holes may be located anywhere along the tray. For example, the through holes may be located along a longitudinal or latitudinal axis of the tray. The through holes may be an individual through hole. For example, a single through hole may be located at a center point of the tray. The through holes may be uniformly dispersed throughout the tray. The through holes may be unevenly dispersed throughout the tray. For example, a plurality of through holes may be located near a first peripheral edge while a single through hole may be located near a second peripheral edge. The through holes may be integrally formed with the tray. For example, the tray may be injection-molded and the through holes are designed directly into the mold. The through holes may be created after forming of the tray. For example, the through holes may be cut, drilled, punched, grinded, sawed, bored, or a combination thereof. The through holes may be bored substantially perpendicular to the work surface. The through holes may be bored at an angle other than substantially perpendicular to the work surface. For example, the angle of the through holes relative to the work surface may be about 45 degrees or greater, about 60 degrees or greater, or about 75 degrees or greater. The angle of the through holes relative to the work surface may be about 135 degrees or less, about 120 degrees or less, or about 105 degrees or less. A plurality of through holes may receive a single line. For example, a first set of through holes may receive a first line, while a second set of through holes may receive a second line.

Figure 5:
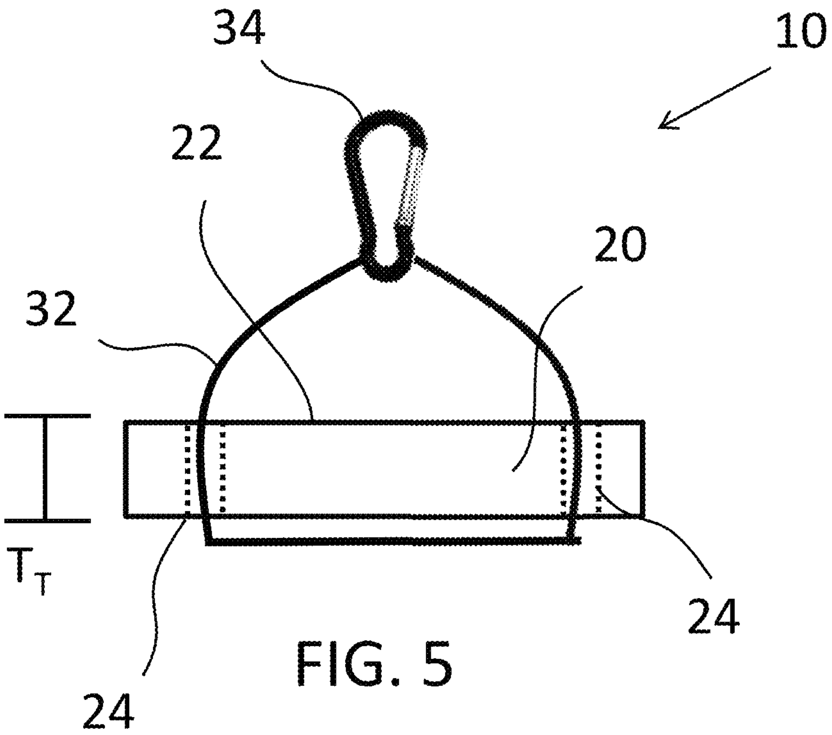
FIG. 5 is a front view of a work station.

The lines may function to secure the tray to an object in a suspended state. The lines may function to maintain a position of the tray when connected (i.e., installed) to the object. For example, the lines may connect to a ladder and maintain a position of the tray substantially parallel to the ground while the ladder is in use. The lines may support a bottom surface of the tray. For example, a line may be fed through a first through hole by entering the through hole from the work surface of the tray and routed through a second hole by entering the through hole from the opposing surface, so that the line abuts the opposing surface to support the tray in the suspended state (as shown in FIG. 5). Alternatively, a first end of the line may be routed through a first through hole and an opposing end of the line may be routed through a second through hole, each routing being done from the work surface.

The lines may be secured to the tray using one or more fasteners, one or more adhesive, or both. The one or more fasteners may be a nut, bolt, screw, nail, staple, weld, clip, rivet, hook and loop fastener, tie, latch, or a combination thereof. The one or more adhesives may be epoxy, polyurethane, cyanoacrylate, acrylic, polychloroprene, rubber cement, or a combination thereof. For example, the lines may be fed through one or more through holes and fastened or adhered to a bottom surface of the tray. The lines may be free of one or more fasteners, one or more adhesives, or both. For example, the lines may be fed through one or more through holes and knotted on one or more ends such that the knot of the line has a size greater than the one or more through hole so that the lines are prevented from being removed from the one or more through holes. The lines may be knotted on one or more ends and include one or more washers abutting the knots so that a bottom surface of the tray rests on the one or more washers.

The lines may be a variety of materials. The lines may be rope, wire, string, twine, cord, or a combination thereof. For example, the lines may be nylon rope, bungee cord, metal wire, or a combination thereof. The lines may the same material or dissimilar materials. For example, a first line may be rope while a second line may be wire. The lines may have a diameter or size smaller than a diameter or size of the through holes. For example, the through holes may have a diameter of about 25 mm while the lines may have a diameter less than about 25 mm. The lines may connect to one or more locking mechanism to secure the lines to one or more objects.

The locking mechanisms may function to secure the lines directly or indirectly to one or more objects. For example, the locking mechanisms may attach directly to one or more rungs of a ladder (e.g., the locking mechanisms are clips that clip directly to the one or more rungs). Alternatively, the locking mechanisms may indirectly attach to a rail of the ladder (e.g., the locking mechanisms are received by an adapter connected to the rail of the ladder). The locking mechanisms may attached to one or more objects such as a ladder, rail, banister, hook, vehicle, desk, chair, work bench, or a combination thereof.

The locking mechanisms may include one or more clips, hooks, prongs, shackles, straps, ties, fasteners (e.g., screws, bolts, etc.), latches, pegs, pins, buttons, clasps, or a combination thereof. For example, the locking mechanisms may be clips such as a carabiner shackle having a metal loop with one or more spring-loaded gates to receive a portion of the one or more objects in the metal loop. The carabiner may be adapted to engage the lines of the work station. For example, the lines may be connected to one or more carabiners such that, when the lines are wrapped around a rung of a ladder, the carabiners latch onto the lines, forming an attachment loop around the rung and suspending the work station from the rung of the ladder. The locking mechanisms may vary from one another. For example, a first locking mechanism may be a carabiner while a second mechanism may be a clasp. Alternatively, the locking mechanisms may be uniform (i.e., each locking mechanism is the same).

The locking mechanisms may be attached to the one or more lines anywhere along a length of the lines. For example, the locking mechanisms may be secured to one or more ends of the lines. Alternatively, the locking mechanism may be secured to the lines at a location other than the one or more ends. For example, the locking mechanism may be a carabiner and the lines are fed through the metal loop of the carabiner so that the carabiner is positioned near a midpoint of the lines and located over a center point of the tray when the work station is secured and suspended from an object. The locking mechanisms may be free of connection to the lines. For example, the locking mechanisms may be directly connected to the tray via the notches, cutouts, through holes, or a combination thereof. Alternatively, the locking mechanisms may be adhered or fastened to a surface of the work station (e.g., the work surface).

Turning now to the figures, FIG. 1 illustrates a top view of an exemplary work station 10. The work station 10 includes a tray 20 having a work surface 22. The work surface 22 includes a plurality of receiving shapes 30 adapted to receive a paint can 30A and a roller pan 30B. The tray 20 further includes a cut out 28 to receive and hold one or more tools, one or more supplies, additional items, or a combination thereof. A notch 26 is located along a peripheral edge of the tray 20, the peripheral edge forming a tray length $L_T$ of the tray 20. While not illustrated, it should be noted that the notch 26 may alternatively be positioned along a peripheral edge forming a tray width $W_T$ of the tray 20. A plurality of through holes 24 extend from the work surface 22 through the tray 20 to an opposing surface to receive one or more lines (not shown) adapted to install the work station 10 (as shown in FIGS. 6 and 7).

Figure 2:
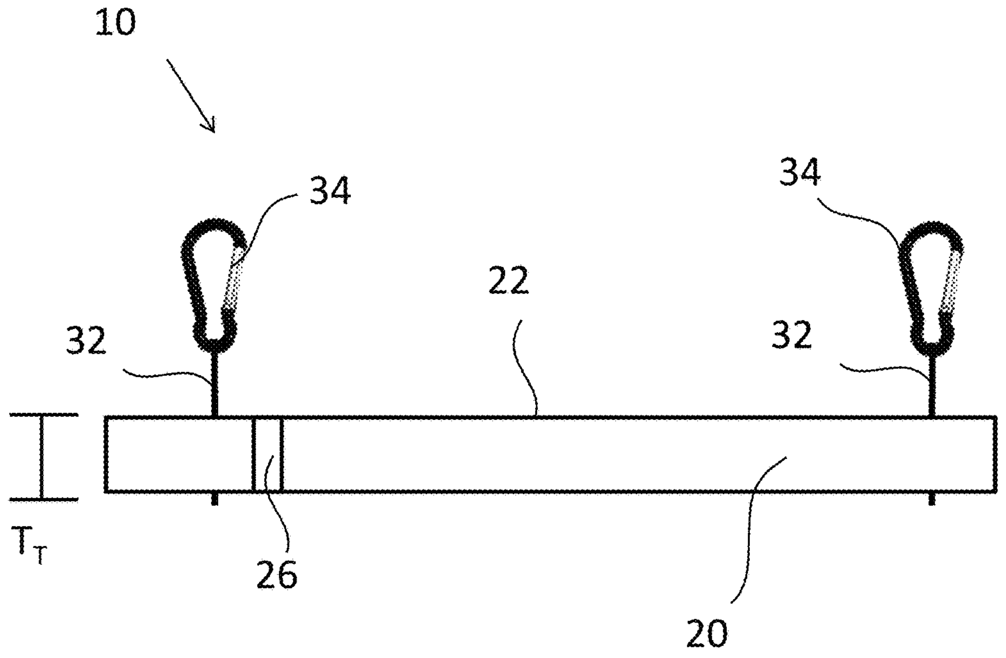
FIG. 2 is a side view of a work station.
Figure 3:
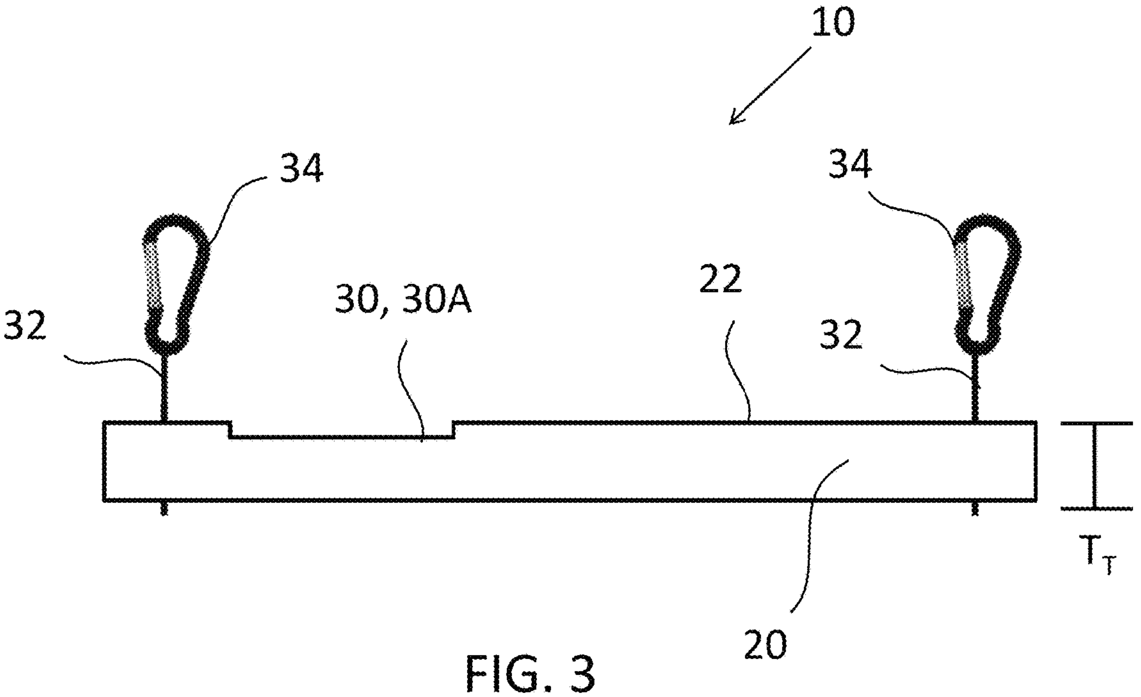
FIG. 3 is a cross-sectional view of the work station of FIG. 1.
Figure 4:
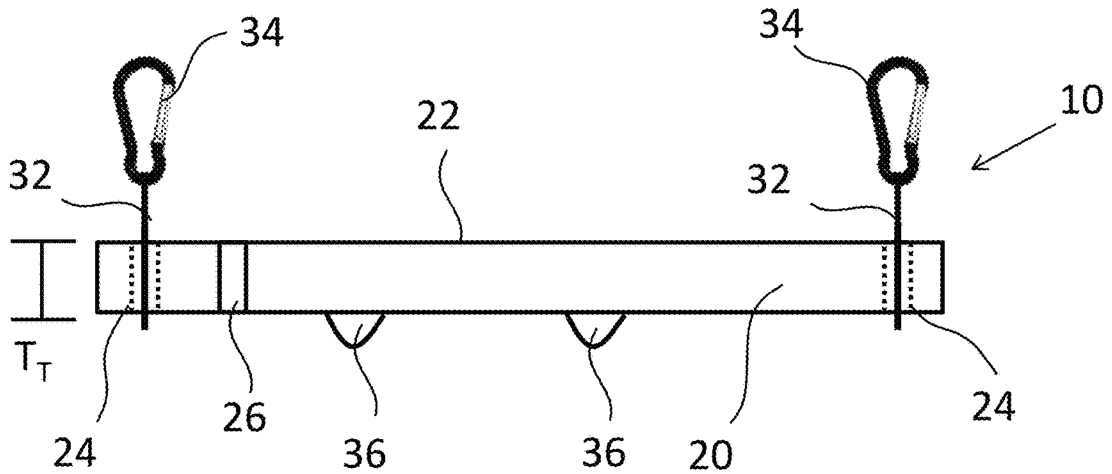
FIG. 4 is a side view of a work station.

FIGS. 2-4 illustrate a work station 10 including a tray 20 having a work surface 22. A plurality of lines 32 extend from the work surface 22 to an opposing surface of the tray 20 via a plurality of through holes 24 extending through a thickness $T_T$ of the tray 20 (as shown in FIG. 4). Each line 34 is secured to a locking mechanism 34 adapted to install the work station 10 (as shown in FIGS. 6 and 7). The tray 20 further includes a notch 26 along a peripheral edge. As shown in cross-sectional view 3-3 of FIG. 3, the work surface 22 includes a receiving shape 30 that is recessed from the work surface 30 to form a paint can receiving shape 30A. The tray may include a plurality of strengthening ribs 36 along the opposing surface of the tray 20.

FIG. 5 illustrates a front view of a work station 10. The work station 10 includes a tray 20 having a work surface 22, and a plurality of through holes 24 extending from the work surface 22 to an opposing surface of the tray 20, through a thickness $T_T$ of the tray 20. A line 32 is run through the plurality of through holes 24 to support the opposing surface of the tray 20 when the tray 20 is installed to an object (e.g., a ladder). The line 32 is connected to a locking mechanism 34 secured to a first end and an opposing second end of the line 32.

Figure 6:
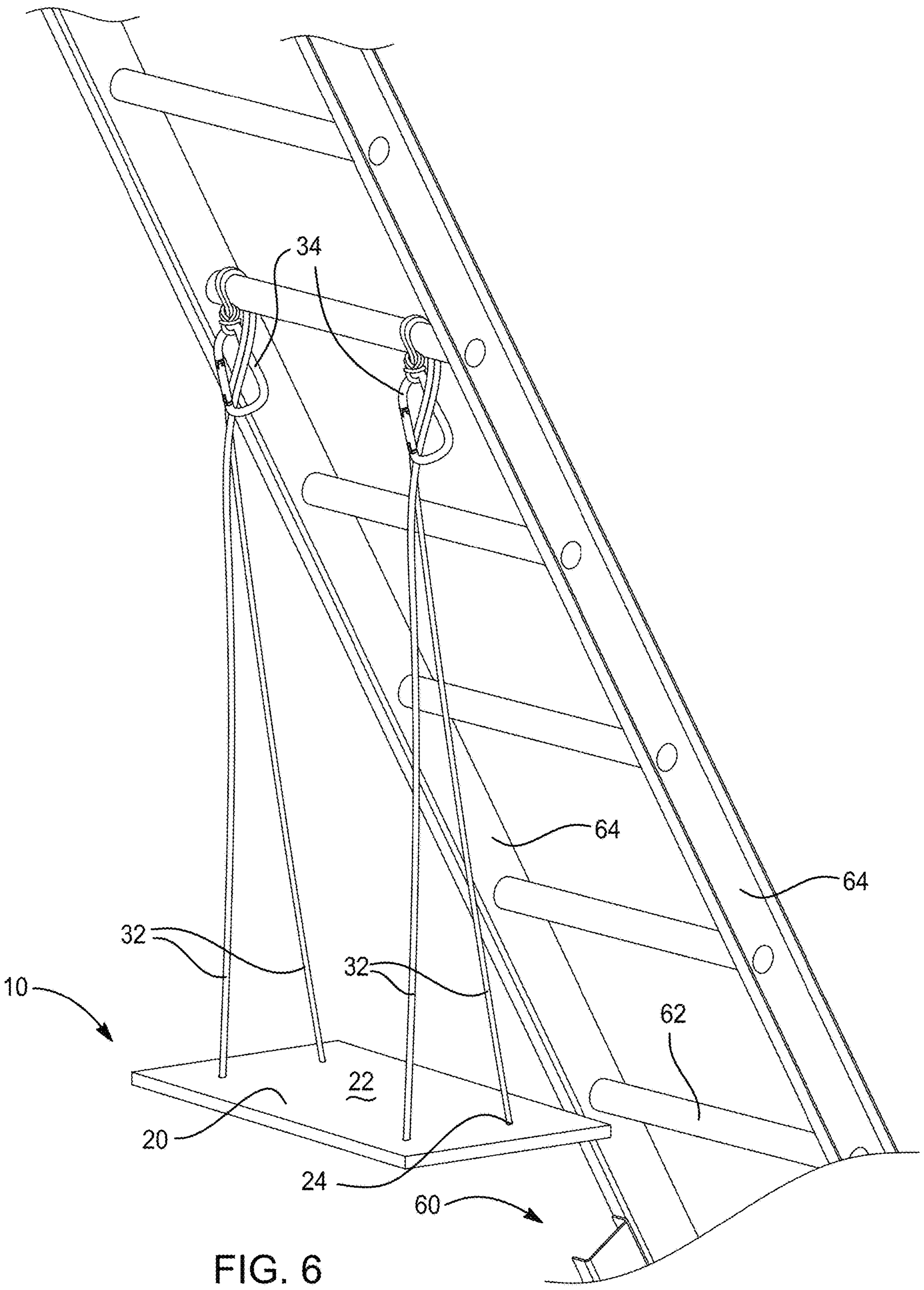
FIG. 6 is a perspective view of a work station suspended from a ladder.
Figure 7:
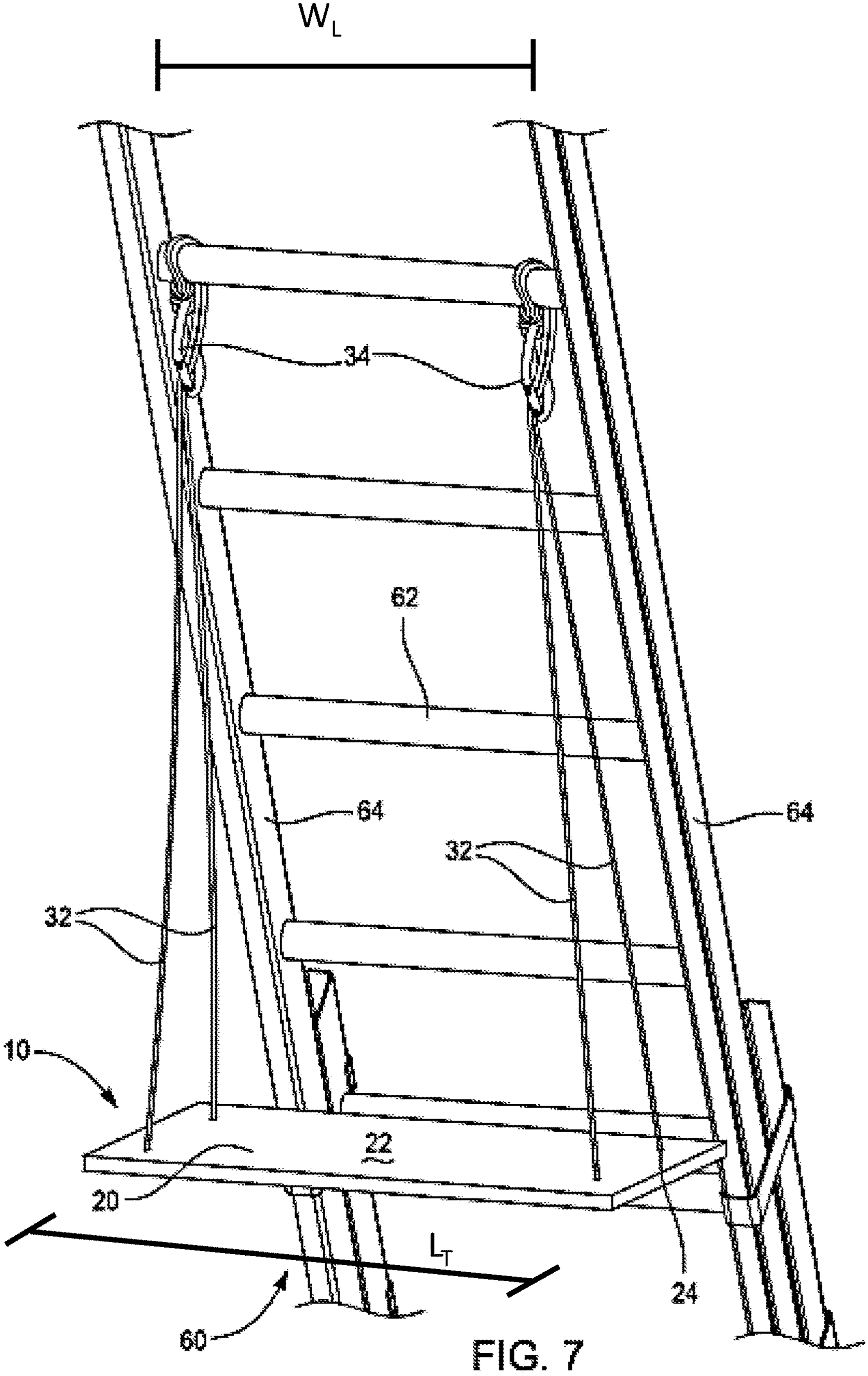
FIG. 7 is a front perspective view of a work station suspended from a ladder.

FIGS. 6 and 7 illustrate perspective views of a work station 10 suspended from a ladder 60. The work station 10 includes a tray 20 having a work surface 22. A plurality of lines 32 are run through a plurality of through holes 24 extending from the work surface 22 to an opposing surface to support the tray 20 (as shown in FIG. 5). The plurality of lines 32 are secured to a locking mechanism 34 on both a first end and an opposing second end. Each line 32 is wrapped around a rung 62 of the ladder 60 spanning between opposing rails 64 so that the locking mechanisms 34 engages the lines 32 to form a loop around the rung 62, preventing unintentional disengagement of the work station from the ladder 60. To uninstall, the locking mechanisms 34 are disengaged from the lines 32, and the lines are unwrapped from the rung 62 of the ladder 60. As shown in FIG. 7, a length ($L_T$) of tray 20 is greater than a width ($W_L$) between the opposing rails 64 of the ladder 60.

While the figures illustrate a work station having a generally box-shape or rectangular cross-section, other shapes are also possible. For example, the work station may have one or more additional surfaces or structures extending from the generally rectangular tray. The work station may have a generally triangular, square, rectangular, pentagon, hexagon shape, or the like. The work station may include more than two lines to support the tray. The work station may include a single line to support the tray. While the figures illustrate a work station installed to a rung of a ladder, other installation techniques are possible. For example, the work station may be installed to one or more rails of a ladder as opposed to the rungs. Alternatively, the work station may be installed to another object other than a ladder without the line being wrapped around the object.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. An article comprising:

i. a tray having a plurality of through holes extending from a work surface of the tray to an opposing surface of the tray through a thickness of the tray; and ii. a first line and a second line that support the opposing surface of the tray, the first line and the second line each being connected to a separate locking mechanism, the locking mechanisms being carabiner clips, wherein the article is secured to a ladder in a suspended state solely by the locking mechanisms, the suspended state having the tray hanging by the first line and the second line, and being supported solely by the first line and the second line;

wherein the first line is routed through a first pair of holes near a first end of the tray and the second line is routed through a second pair of holes near an opposing second end of the tray; and wherein the first line is free of contact with the second line.

2. The article according to claim 1, wherein the article is secured to a rung of the ladder by wrapping the first line and the second line around the rung, locking the locking mechanism connected to the first line to the first line, and locking the locking mechanism connected to the second line to the second line.

3. The article according to claim 1, wherein the first line and the second line are routed through respective first holes by entering the first holes from the work surface of the tray and routed through respective second holes by entering the second holes from the opposing surface, so that the first line and the second line abut the opposing surface to support the tray in the suspended state.

4. The article according to claim 1, wherein the article is a work station.

5. The article according to claim 1, wherein the tray includes one or more notches along a peripheral edge of the tray.

6. The article according to claim 1, wherein the tray includes one or more strengthening ribs along the opposing surface of the tray.

7. The article according to claim 1, wherein the tray includes one or more cutouts extending through the thickness of the tray.

8. The article according to claim 7, wherein the one or more cutouts are adapted to hold a paint brush.

9. The article according to claim 1, wherein the tray includes a receiving shape located on the work surface.

10. The article according to claim 9, wherein the receiving shape is recessed from the work surface and shaped substantially similar to a paint can to secure the paint can.

11. The article according to claim 1, wherein the first line and the second line distribute a weight of the article evenly while in the suspended state so that the tray remains substantially parallel to the ground.

12. The article according to claim 1, wherein the plurality of through holes are four through holes positioned near each of four corners of the tray.

13. The article according to claim 1, wherein a peripheral edge of the tray abuts opposing rails of the ladder when the article is installed.

14. The article according to claim 1, wherein the thickness of the tray is less than 30 mm.

15. An article comprising:

i. a tray having a plurality of through holes extending from a work surface of the tray to an opposing surface of the tray through a thickness of the tray; and ii. a first line and a second line that support the opposing surface of the tray, the first line and the second line each being connected to a locking mechanism, wherein the article is secured to a ladder in a suspended state solely by the locking mechanisms, the suspended state having the tray hanging by the first line and the second line, and being supported solely by the first line and the second line;

wherein the first line is routed through a first pair of holes near a first end of the tray and the second line is routed through a second pair of holes near an opposing second end of the tray;

wherein the article is secured to a rung of the ladder by wrapping the first line and the second line around the rung, locking the locking mechanism of the first line to the first line, and locking the locking mechanism of the second line to the second line; and wherein a length of the tray is greater than a width of the ladder measuring the span between opposing rails of the ladder.

16. The article according to claim 15, wherein the locking mechanisms are carabiner clips.

17. The article according to claim 1, wherein a length of the tray is greater than a width of the ladder measuring the span between opposing rails of the ladder.

18. The article according to claim 15, wherein the first line is free of contact with the second line.

19. The article according to claim 15, wherein the tray further includes:

(a) a notch configured to hold a paint roller along a peripheral edge of the tray;

(b) a cutout extending through the thickness of the tray, the cutout being free of contact with any peripheral edge of the tray;

(c) a first receiving shape recessed from the work surface and shaped substantially similar to a paint can to secure the paint can; and (d) a second receiving shape recessed from the work and located adjacent to the first receiving shape, the second receiving shape being shaped substantially similar to a roller pan to secure the roller pan;

wherein the notch, the cutout, the first receiving shape, and the second receiving shape are free of contact with one another.

20. The article according to claim 15, wherein the locking mechanisms are fixedly secured to ends of the first line and the second line so that the locking mechanisms are free of movement along the first line and the second line, the ends being a location on the first and the second line farthest away from the tray in the suspended state.

* * * * *